(12) United States Patent
Munson et al.

(10) Patent No.: US 6,255,989 B1
(45) Date of Patent: Jul. 3, 2001

(54) METHOD AND SYSTEM FOR ADDRESSING LOCATIONS BASED UPON LATITUDE AND LONGITUDE POSITIONS

(76) Inventors: Edward Munson, 1545 Oaklawn Ave., Southold, NY (US) 11971; William H. Altman, 18 Long La., Hampton Bays, NY (US) 11946

( * ) Notice: Subject to any disclaimer, the term of this patent is extended or adjusted under 35 U.S.C. 154(b) by 0 days.

(21) Appl. No.: 09/391,082

(22) Filed: Sep. 4, 1999

(51) Int. Cl.[7] .............................. G01S 5/02; H04B 7/185; G06F 7/00
(52) U.S. Cl. ...................................... 342/357.13; 700/226
(58) Field of Search .......................... 342/357.06, 357.17, 342/357.13, 357.1; 235/375, 378; 700/224, 226

(56) References Cited

U.S. PATENT DOCUMENTS 5,727,057 * 3/1998 Emery et al. ..................... 379/211

* cited by examiner

Primary Examiner—Thomas H. Tarcza
Assistant Examiner—Fred H. Mull
(74) Attorney, Agent, or Firm—Michael I. Kroll

(57) ABSTRACT

A method and system for locating an address of a space based upon latitude and longitude coordinates. The latitude and longitude positioning system includes a global positioning satellite for measuring the latitude and longitude coordinates of the space to be addressed and a device for generating a unique variable string based upon the measured latitude and longitude coordinates. The variable string is stored in a storage device and a device for selectively disseminating the variable string is provided for informing persons desirous of learning the location of the space of the variable address string. The variable string may be represented as a numerical string. A keypad is also provided connected to the generating device for inputting data related to special features related to the location of the space such as a height of the space and floor on which the space is located within a structure. The dissemination device includes a modem for connection with a telephone line for transmitting the address string to a party on an opposite end of a telephone communication channel established on the telephone line, a send button for initiating transmission of the variable string across the telephone line and an emergency button for initiating a telephone call by the modem to an emergency services station for transmission of the variable string across the telephone line to the emergency services station.

16 Claims, 3 Drawing Sheets

Figure 1:
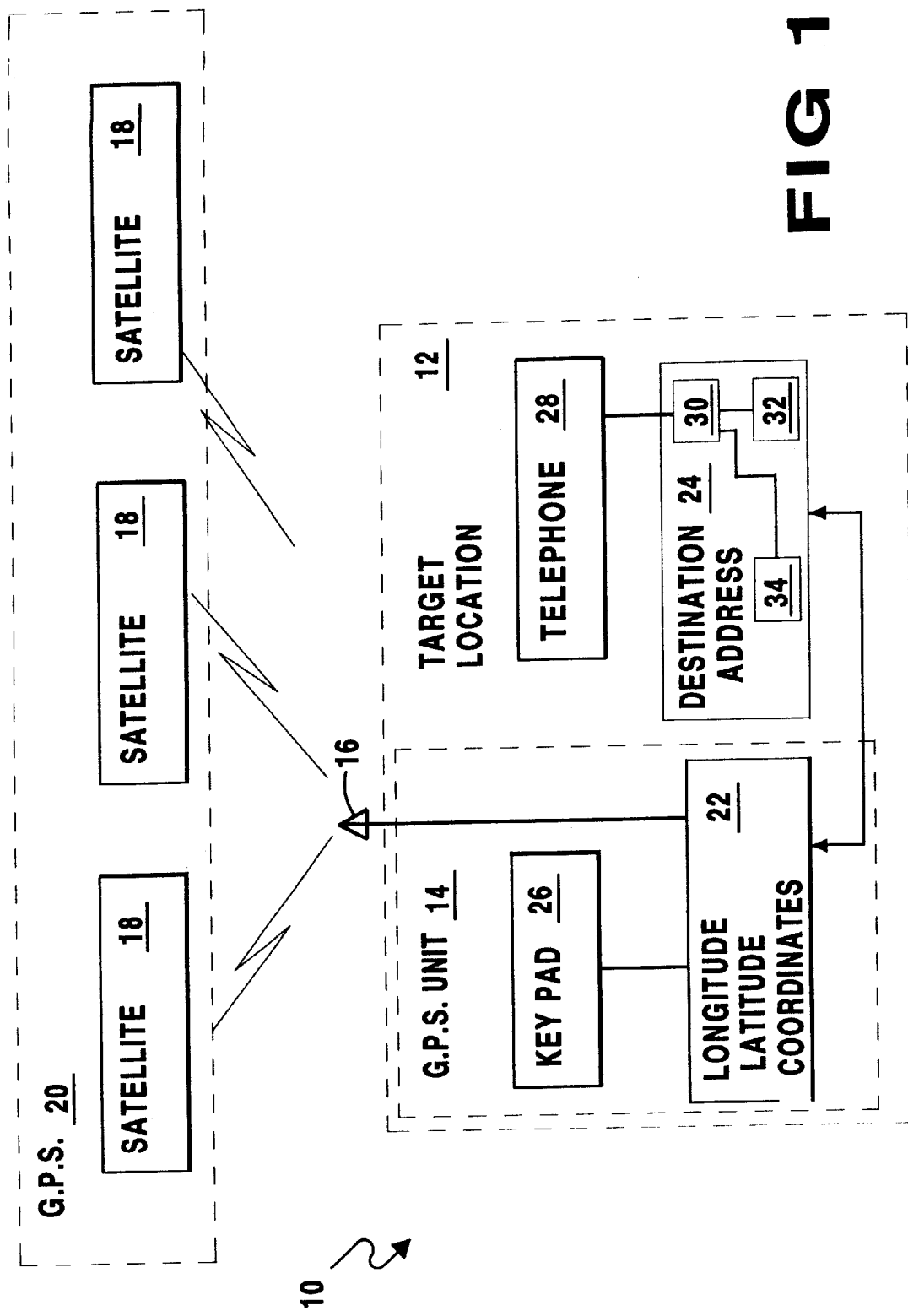

METHOD AND SYSTEM FOR ADDRESSING LOCATIONS BASED UPON LATITUDE AND LONGITUDE POSITIONS

BACKGROUND OF THE INVENTION

1. Field of the Invention

The present invention relates generally to address location systems and, more specifically, to a system for addressing locations based upon latitude and longitude coordinate measurements generated by a precise positioning system, e.g. Global Positioning Satellite (G.P.S.), D.G.P.S., other satellite based positioning systems or other means. The measurements are recorded by a precise positioning system unit and disseminated as a unique destination address for that location. The destination address is then identified as the permanently unique location address for all inquiries, mailpieces and deliveries for this location in place of the current address system which includes building number, street name, city, state and zip code.

This unique permanent address defining the latitude and longitude coordinates of the location allows for mailpiece delivery without confusion regardless of national borders or municipal renumbering and renaming of streets. Furthermore, this permanent address system simplifies the destination address to a substantially numerical string lending itself to being easily entered and identified in computerized address databases while promoting an international standard addressing system.

2. Description of the Prior Art

Numerous other addressing and delivery systems are provided in the prior art. Typical of these are U.S. Pat. Nos. 4,845,761; 5,420,403; 5,612,889 and 5,828,322. While these addressing and delivery systems may be suitable for the purposes for which they were designed, they would not be as suitable for die purposes of the present invention, as hereinafter described.

U.S. Pat. No. 4,845,761

Inventor: Grant M. Cate et al.

Issued: Jul. 4, 1989

A system for locating possible address information contained in a window area of a mail item is provided. This system includes a source of illumination and detectors for sensing the reflectivity of the mail item. Circuitry is provided for measuring the reflectivity from the mail item. Circuitry is also provided for determining the presence of a window on the mail item and the coordinates of the detected window. Additional circuitry is provided for selecting address information contained within a window location by the window detect circuitry.

U.S. Pat. No. 5,420,403

Inventor: David R. Allum et al.

Issued: May 30, 1995

Mail can be sorted automatically to a point of delivery level by deriving from the address including postal code on a piece of mail a suffix which together with the postal code forms routing data which uniquely identifies the final delivery address. This is achieved automatically by the Post office sorting facility by means of an optical character reader which reads the addresses on mail items and a computer arranged to generate a suffix based on the address read. The routing data is printed as a bar code on the mail item and this allows the complete sortation to be effected automatically. Also contemplated is a progressive encoding system which can be applied as bar codes by customers as desirable to mail pieces. The basic data is the routing data set to which can be added a shipment number which allows automatic revenue accounting control and a piece number which allows automatic track and trace. Finally, the customer may also progressively encode return mail envelopes with the shipment number followed by a product code and a user defined field which permits automatic specialized handling of the return mail item.

U.S. Pat. No. 5,612,889

Inventor: Leon A. Pintsov et al.

Issued: Mar. 18, 1997

A mailing list is created including destination addresses for mailpieces to be submitted to a carrier service for delivery. A unique mailpiece identifier associated with mailpieces on the mailing list is generated by the carrier or other trusted third party. The unique mailpiece identifier is printed on the mailpiece with which it is associated. The mailpieces with the printed unique identifier are submitted to the carrier service. The carrier service obtains the printed unique identifier from the mailpiece. The obtained unique identifier from each said mailpiece is utilized to verify that data associated with the mailpiece has been processed by the carrier or trusted third party. When the unique number has been obtained from the mailpieces, the carrier service, if desirable, may note this fact in the carrier records to prevent reuse of the unique identifier. The carrier service as part of issuing the unique identification may: charge the mailer's account of other fund depository for the carrier service charges associated with the mailpiece; and/or, assign a destination delivery code; and/or, provide address hygiene for the mailpiece; and/or change of address processing. When the unique identifier is obtained from the mailpiece, a delivery point destination code may be printed on the mailpiece, based on the corrected address. As an alternative, the destination delivery code may be provided to the mailer with the unique mailpiece identifier to be printed on the mailpiece by the mailer. Various cryptographic techniques may be employed to authenticate the mailer and the carrier service and to protect the transmitted information between the parties. The payment for the carrier service can he implemented prior in time to the entry of the mailpieces to the carrier service mailstream. Unauthorized mailpieces may be sorted early in the carrier service processing procedure.

U.S. Pat. No. 5,828,322

Inventor: Hans Joachim Eberhard

Issued: Oct. 27, 1998

Printed matter is distributed between a source location and a plurality of geographically separate target locations by providing at each of the target locations a location transmitter capable of emitting a unique identifying code and packing at the source location individual orders of the printed matter for the target locations into respective containers and providing each of the containers with a container transmitter capable of generating a unique identifying code. The packed containers for a plurality of the target locations are loaded onto a truck and the codes of the containers being loaded are recorded in a respective portable device on each trunk along with the respective target locations. The device continuously electronically determines the position of the truck and guides the loaded truck along a route past the respective plurality of target locations in accordance with the electronically determined truck position, typically by providing optical or audible instructions for the driver. When the truck reaches each target location the respective target-location transmitter is read and an acoustic or optical output is generated by the device indicating which of the containers is to be unloaded thereat. Then at each target location any container whose code is associated with the respective target location is unloaded.

It is therefore desirable to provide a latitude and longitude positioning system for addressing locations wherein the latitudinal and longitudinal coordinates of the location provide a simplified destination address formed of a substantially numerical string thereby lending itself to computerized address databases. It is further desirable to provide a latitude and longitude positioning system for addressing locations which will promote an international standard addressing system. It is even further desirable to provide a latitude and longitude positioning system for addressing locations able to eliminate the necessity to change an address due to the renaming of streets such as for commemorating a historical or noteworthy event or person. It is yet further desirable to provide a latitude and longitude positioning system for addressing locations able to minimize the database storage space required to store potentially long street names, city names and multi-line addresses as numerous computer databases allocate only 120 characters of storage to accommodate address data. It is still further desirable to provide a latitude and longitude positioning system for addressing locations which eliminates the dependence on potentially long street names, city names and multi-line addresses. It is yet further desirable to provide a latitude and longitude positioning system for addressing locations which eliminates the dependence of the present address systems on frequently reused street names which often leads to confusion in locating a destination, addressing mailpieces and delivery of mailpieces. It is even further desirable to provide a latitude and longitude positioning system for addressing locations which eliminates potentially long street names, city names and multi-line addresses able to provide a uniform system for international mail thereby unifying the system in which addressing schemes differ significantly from one country to the next, each country having its own unique addressing schemes, such as street name, street number, province, state, town, and postal code which also changes with the dissolution of countries and the creation of new ones.

While present location addressing systems may function well on the local level, they are inadequate for the global economy and place unnecessary strain on computerized databases. It is therefore felt that a need exists for a national as well as international system for addressing locations which eliminates a dependence on geopolitical boundaries.

SUMMARY OF THE PRESENT INVENTION

The present invention relates generally to location address systems and, more specifically, to a system for addressing locations using latitudinal and longitudinal coordinate measurements generated by a a precise positioning system unit. The measurements are recorded by the user and disseminated as a unique destination address for that location. The destination address is then identified as the permanently unique location address for all inquiries, mailpieces and deliveries for this location in place of the current addressing system which includes building number, street name, city, state and zip code.

A primary object of the present invention is to provide a latitude and longitude positioning system that will overcome the shortcomings of prior art devices.

A further object of the present invention is to provide a latitude and longitude positioning system able to generate a permanently unique address based upon the latitudinal and longitudinal coordinates of a location.

Another object of the present invention is to provide a latitude and longitude positioning system able to be used by existing automated delivery and sorting technologies for determining the location of a structure.

Yet another object of the present invention is to provide a latitude and longitude positioning system able to be used in conjunction with a unique return address to generate a standardized tracking number that can be used by all shipping providers.

Still yet another object of the present invention is to provide a latitude and longitude positioning system able to provide a location of a structure regardless of geographic boundaries.

Yet another object of the present invention is to provide a latitude and longitude positioning system able to be used to query a vendor database as to the status and location of a purchased or shipped product.

A still further object of the present invention is to provide a latitude and longitude positioning system able to be used to contact emergency personnel and lead the emergency personnel to the location from which the contact was originated.

Additional objects of the present invention will appear as the description proceeds.

A method and system for locating an address of a space based upon latitude and longitude coordinates is described by the present invention. The latitude and longitude positioning system includes a global positioning satellite for measuring the latitude and longitude coordinates of the space to be addressed and a device for generating a unique variable string based upon the measured latitude and longitude coordinates. The variable string is stored in a storage device and a device for selectively disseminating the variable string is provided for informing persons desirous of learning the location of the space of the variable address string. The variable string may be represented as a numerical string. A keypad is also provided connected to the generating device for inputting data related to special features related to the location of the space such as a height of the space and floor on which the space is located within a structure. The dissemination device includes a modem for connection with a telephone line for transmitting the address string to a party on an opposite end of a telephone communication channel established on the telephone line, a send button for initiating transmission of the variable string across the telephone line and an emergency button for initiating a telephone call by the modem to an emergency services station for transmission of the variable string across the telephone line to the emergency services station.

The present invention overcomes the shortcomings of the prior art by providing a latitude and longitude positioning system using latitudinal and longitudinal coordinate measurements from a precise positioning system. The coordinates from the precise positioning system are stored thereby and disseminated as the unique destination address for the location. The destination address is then applied to all mailings as the return address and supplied as the permanently unique location address for all mailpieces for this user.

Further, this permanently unique address comprising the latitude and longitude positioning coordinates of the location provides means for mailpiece delivery regardless of international borders or municipal renumbering and renaming of streets, as well as, simplifying the location address of a structure to a substantially numerical string able to be efficiently utilized by computerized address databases and promote an international standard addressing system.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 2:
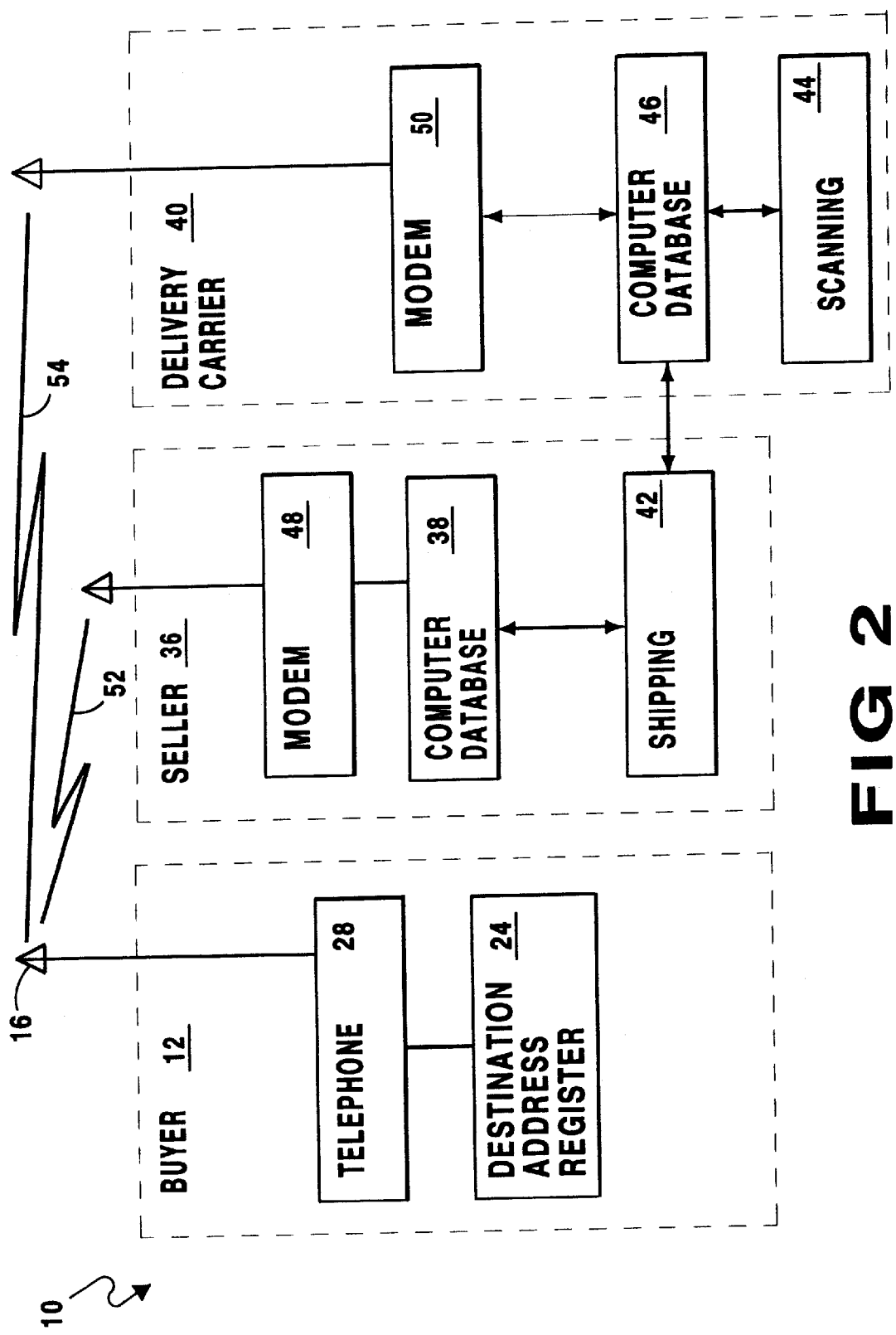
Figure 3:
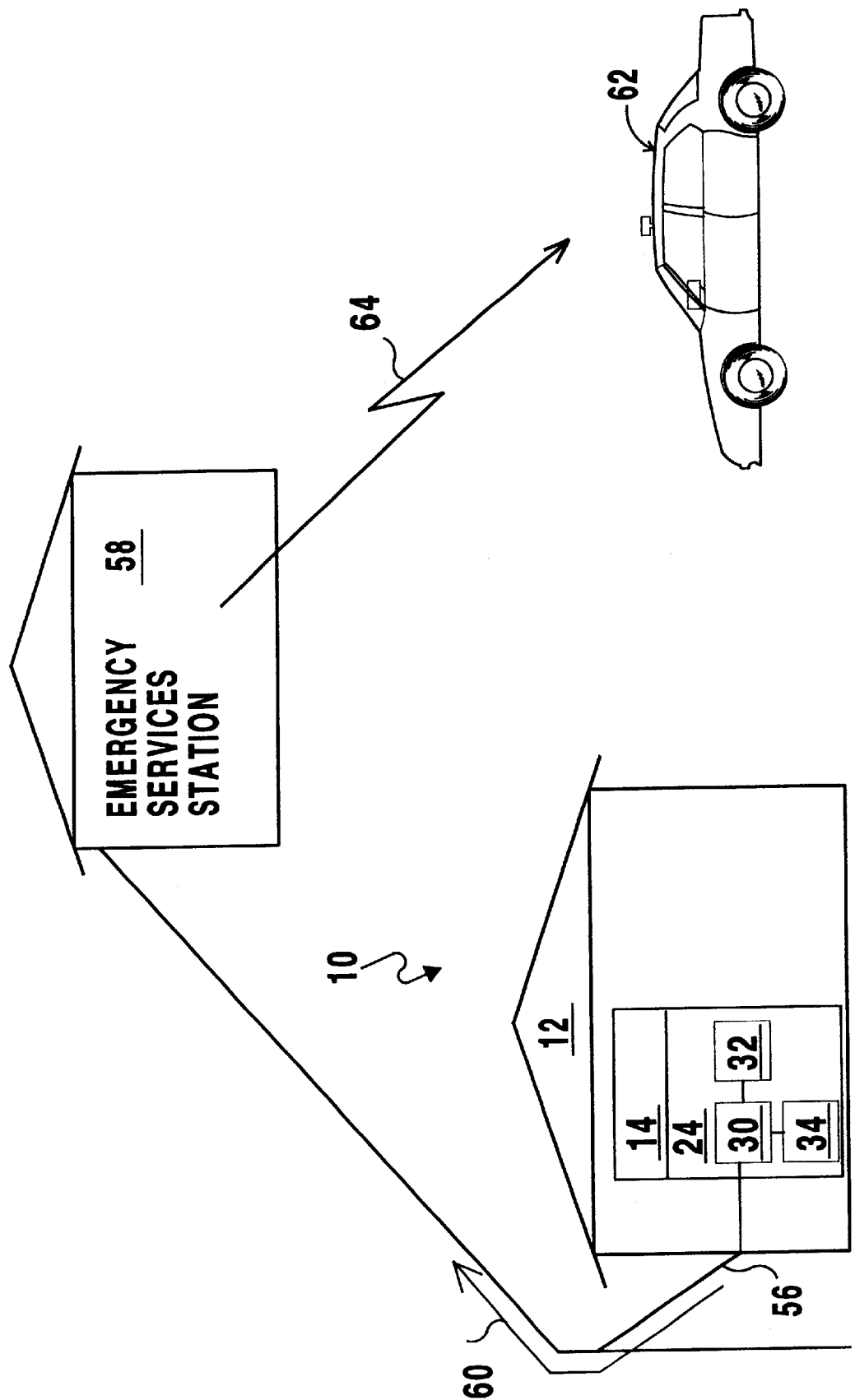

FIG. 1 is a block diagram of the latitude and longitude positioning system of the present invention wherein a target location at which a precise positioning system receiver is used to acquire the latitude and longitude positioning coordinates for the location disseminates the coordinates as the permanently unique address for the location;

FIG. 2 is a block diagram of the latitude and longitude positioning system of the present invention wherein a buyer having a unique address comprising latitude and longitude coordinates determined by the precise positioning system disseminates the destination address to a vendor for purchasing goods from the vendor and delivery of the goods; and FIG. 3 is a perspective view of an emergency call being placed to contact emergency personnel directing them to a location identified by an address obtained with the latitude and longitude positioning system of the present invention.

DESCRIPTION OF THE REFERENCED NUMERALS

Turning now descriptively to the drawings, in which similar reference characters denote similar elements throughout the several views, the Figures illustrate the latitude and longitude positioning system of the present invention. With regard to the reference numerals used, the following numbering is used throughout the various drawing figures.

10 latitude and longitude positioning system of the present invention 12 structure of which address is to be determined
14 latitude and longitude positioning system unit
16 antenna of precise positioning system satellite unit
18 satellites forming the precise positioning system
20 precise positioning system
22 latitude and longitude positioning coordinate device
24 destination address register
26 keypad of precise positioning system unit
28 telephone
30 modem within destination address register
32 emergency button on destination address register
34 address send key
36 seller location
38 computer database of seller
40 delivery carrier location
42 shipping database of seller
44 scanner of delivery carrier for input of destination address
46 computer database of delivery carrier
48 modem of seller
50 modem of delivery carrier
52 line indicating inquiry by buyer to seller
54 line indicating inquiry by buyer to delivery carrier
56 telephone line
58 central emergency/9-1-1 station
60 signal transmitted to central emergency/9-1-1 station
62 emergency vehicle
64 signal transmitted by central emergency/9-1-1 station to emergency vehicle

DETAILED DESCRIPTION OF THE PREFERRED EMBODIMENT

Turning now descriptively to the drawings, in which similar reference characters denote similar elements throughout the several views, FIGS. 1 through 3 illustrate the latitude and longitude positioning system of the present invention indicated generally by the numeral 10.

The latitude and longitude positioning system 10 is used to determine the latitude and longitude positioning coordinates of a location and provide a unique numerical address for identifying a structure 12 at the location. This system 10 is designed to simplify and replace the currently used systems for identifying the location of structures 12, i.e. using building number, street name, city, state and country, with an easily remembered universally accepted numerical string similar to a telephone number. The system 10 is illustrated in FIG. 1 which shows the obtaining of an address for a structure 12 at a particular location using the latitude and longitude positioning system 10 of the present invention.

Positioned within the structure 12 at a particular location is a latitude and longitude positioning system unit 14. An antenna 16 of the latitude and longitude positioning system unit 14 is used to establish a communication channel with satellites 18 of a system of precise positioning system 20 orbiting the earth. The satellites 18 are used to determine latitudinal and longitudinal coordinates for the location of the structure 12 and identify the determined coordinates by a unique numerical string value. In communication with the satellites 18, a latitude and longitude coordinate determining device 22 receives signals representative of the latitude and longitude of the latitude and longitude positioning system unit 14 via the antenna 16. The latitude and longitude coordinate determining device 22 generates a numerical string unique to the location of the latitude and longitude positioning system unit 14 based upon the latitude and longitude coordinate values received from the satellites 18. The numerical string would identify the structure as a telephone number identifies the telephone line to the structure and is stored in a destination address register 24. A user of the latitude and longitude positioning system 10 is able to retrieve the destination address from the destination address register 24. The address is then disseminated to the public thereby alerting anyone as to the location of the structure 12 thereby allowing for delivery of mailpieces and providing a destination address for visitors to the structure 12. The destination address register 24 may include a display for displaying the destination address and thus provide a visual indication of the address to the user.

A keypad 26 is provided on the latitude and longitude positioning system unit 14 for inserting certain parameters to the latitude and longitude coordinate determining device 22 which may affect the determination of an address for a particular location, e.g. an apartment in an apartment building. As large apartment and office buildings are constantly being constructed, apartment and office spaces positioned on top of each other are positioned at the same latitude and longitude. Thus, by entering the floor or height of the space at which the latitude and longitude positioning system unit 14 is positioned, the height of the apartment will be considered when determining the address and spaces positioned on top of each other may be distinguished from one another, Preferably, the latitude and longitude positioning system unit 14 will add a three digit extension on the end of the numerical string address to identify the floor number or height of the space identified by the address. For example, the three digits at the end of the numerical address string may be 000 to identify a single level structure, 007 to identify a space on the seventh floor of an apartment building or 018 to identify an office on the eighteenth floor of an office building. Alternatively, any other type of identification code may be added to the destination address in order to distinguish spaces along the same line of a building from one another.

The destination address register 24 is connected to a telephone 28 and includes a modem 30, an emergency button 32 and a send button 34. The modem 30 connects to the telephone 28 for placing telephone calls through the destination address register 24 thereby allowing the destination address to be transmitted through conventional telephone lines to a receiving party. The emergency button 32 is provided for activating the modem 30 to place a telephone call through the telephone 28 to emergency personnel as is illustrated in FIG. 3.

Activation of the emergency button 32 causes the modem to place the telephone in an off-hook state and dial 9-1-1. Upon connection with a 9-1-1 operator, the destination address register 24 will identify itself and transmit the destination address so that emergency personnel can be dispatched to the location. The destination address register 24 will transmit at least one of an audible and data signal including the destination address. The address send key 34 is also provided on the destination address register 24 for transmitting the destination address over an open telephone communication channel upon activation thereof.

For buildings in which it is in the interest of national security to maintain the latitude and longitude coordinates as secret, a special numerical string unrelated to the latitude and longitude coordinates will be provided as an address. Such buildings would include the White House, the Pentagon, the C.I.A. building, the Capitol, etc. . . . Providing the latitude and longitude coordinates for such structures as information to the general public would compromise national security. Thus, these buildings must be identified by special numerical strings which are unrelated to their global position.

FIG. 2 is a block diagram showing use of the latitude and longitude positioning system 10 to order goods over the telephone. The buyer at the structure 12 to which the ordered goods will be shipped has a unique location address which has been stored in the destination address register 24. When the buyer 12 wishes to purchase goods from a seller 36, the latitude and longitude positioning system unit 14 will provide the destination address of the location 12 to which the goods are to be shipped to the seller 36 upon activation of the send button. The seller 36 inputs the destination address to a computer database 38 and provides the destination address to a delivery carrier 40 for delivery via a shipping database. The shipping database 42 is connected to the computer database 38. The delivery carrier 40 has a scanner 44 for use in inputting the destination address to a computer database 46 in which it is stored. The computer database 46 of the delivery service 40 communicates with the computer database 38 to provide the seller 36 with the destination address to which the goods are to be shipped. The destination address will act as a shipping tracking number. The computer database 38 of the seller 36 is provided with a modem 48 and the computer database 46 of the delivery carrier 40 is provided with a modem 50 for connection to conventional telephone lines. Through the modem 48 the buyer 12 may confirm receipt of the order for goods and track the delivery of the goods by contacting the computer database 38 of the seller 36 through conventional telephone lines as indicated by the line labeled with the numeral 52. Through the modem 50 the buyer 12 may confirm receipt of the order for goods and track the delivery of the goods by contacting the computer database 46 of the delivery service 40 through conventional telephone lines as indicated by the line labeled with the numeral 54.

Use of the latitude and longitude positioning system unit 14 to contact emergency personnel is illustrated in FIG. 3. This figure illustrates the latitude and longitude positioning system unit 14 and the destination address register 24 connected to a conventional telephone line 56. The destination address register 24 includes the modem 30 for establishing the connection with the telephone line 56. The emergency button 32 and send button 34 are connected to the modem 30. When the emergency button 32 is activated, the modem 30 will place the telephone line 56 in an off-hook state and dial 9-1-1 to contact emergency personnel. The telephone call placed by the modem 30 will establish a connection with a local emergency services (9-1-1) station 58. Upon establishing a connection with the emergency services station 58, the emergency button 32 will cause the modem 30 to transmit the location address stored therein to the emergency services station 58 as either an audible or data signal as indicated by the arrow labeled with the numeral 60. Upon receipt of the location address signal 60, an operator at the emergency services station 58 will transmit a signal indicated by the arrow labeled with the numeral 62 to an emergency vehicle 64 such as the police car. The operator will transmit the location address of the emergency and any additional information that they may have regarding the emergency. The location address may be transmitted as a data signal which will be displayed on an on-board computer. The data signal can also be transmitted to extend within a certain radius from the location of the emergency and thus be received by the emergency vehicles closest to the location address.

The operation of the latitude and longitude positioning system 10 will now be described with reference to the figures. In operation, the latitude and longitude positioning system unit 14 of the latitude and longitude positioning system 10 is positioned in a structure which is desirous of establishing a location address. The latitude and longitude positioning system unit 14 is turned on and into an operational mode and connected to a live telephone line in the structure. At this time the user will input any necessary information relating to the position of the latitude and longitude positioning system unit 14 such as if the latitude and longitude positioning system unit 14 is identifying a room located above the first floor of the structure and the floor being identified using the keypad 26.

The latitude and longitude positioning system unit 14 will now establish contact with precise positioning system satellites 18 orbiting the earth to obtain latitude and longitude coordinates of the latitude and longitude positioning system unit 14 and thus the structure being located. The latitude and longitude coordinates are provided to the latitudinal and longitudinal coordinate device 22 wherein a numerical string based upon the latitude and longitude coordinates and the data input using the keypad 26 is generated to identify the location address of the structure. The numerical string is stored within the destination address register where it is available to the user.

The modem 30 destination address register is connected to a live telephone line within the structure and is able to transmit the numerical string to a party at an opposing end of the telephone communication channel. A send button 34 on the destination address register 24 initiates transmission of the numerical string. The send button is preferably used when purchasing goods over the telephone and upon establishment of a communication with a computer. Pressing the send button will produce at least one of an audible or data signal to be transmitted to the party at the opposite end of the communication and thus a delivery address for ordered goods can be provided to the seller. The seller can then provide this delivery address if transmitted in data form to a delivery carrier whereby it can be directly entered into its computer database and also used as a tracking number.

An emergency button 32 is also provided on the destination address register 24. Activation of the emergency button 32 initiates placement of a telephone call by the modem 30 to an emergency services (9-1-1) station and transmission of the destination address from which the call is placed. The emergency services station is then able to alert an emergency unit as to the placement of the call and provide the location address, i.e. the numerical string, so that the emergency unit may investigate the emergency.

From the above description it can be seen that the latitude and longitude positioning system of the present invention is able to overcome the shortcomings of prior art devices by providing a latitude and longitude positioning system which is able to generate a permanently unique address based upon the latitudinal and longitudinal coordinates of a location, can be used by existing automated delivery and sorting technologies for determining the location of a structure and be used in conjunction with a unique return address to generate a standardized tracking number that can be used by all shipping providers. The latitude and longitude positioning system able to provide a location of a structure regardless of geographic boundaries and be used to query a vendor database as to the status and location of a purchased or shipped product. The latitude and longitude positioning system is also able to be used to contact emergency personnel and lead the emergency personnel to the location from which the contact was originated. Furthermore, the latitude and longitude positioning system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desirable to be protected by Letters Patent is set forth in the appended claims:

1. A latitude and longitude positioning system for providing unique uniform addresses for all fixed locations throughout the world based upon latitude and longitude coordinates, said latitude and longitude positioning system comprising:
   a) means in a fixed space to be addressed for measuring the latitude and longitude coordinates of said space;
   b) means connected to said measuring means for generating a unique variable string based upon the measured latitude and longitude coordinates;
   c) means for storing said variable string;
   d) means connected to said storing means for disseminating publicly said variable string; and
   e) a keypad connected to said generating means for inputting an extension to said string identifying special features of said space including height of the space and floor on which the space is located within a structure.

2. The latitude and longitude positioning system as recited in claim 1, wherein said means for measuring includes a global positioning satellite system.

3. The latitude and longitude positioning system as recited in claim 1, wherein said variable string is a numerical string.

4. The latitude and longitude positioning system as recited in claim 1, wherein said dissemination means includes a modem for connection with a telephone line for transmitting said variable string to a party on an opposite end of a telephone communication channel established on the telephone line.

5. The latitude and longitude positioning system as recited in claim 4, wherein said dissemination means further includes a send button for initiating transmission of the variable string across the telephone line.

6. The latitude and longitude positioning system as recited in claim 4, wherein said dissemination means further includes an emergency button for initiating a telephone call by said modem to an emergency services station for transmission of the variable string across the telephone line to the emergency services station.

7. A method for obtaining a unique uniform address for all fixed locations throughout the world, said method including the steps of:
   a) measuring latitude and longitude coordinates for a fixed desired location;
   b) generating a unique variable string based upon the measured latitude and longitude coordinates;
   c) storing the generated variable string for use in identifying the location, thereby eliminating the need for conventional address systems requiring building numbers, street names, city names, state names, countries and zip codes;
   d) inputting by keypad to said generating means an extension to said string identifying special features of said space; and
   e) disseminating the unique uniform address to the public thereby alerting anyone as to the location allowing for delivery of mailpieces, packages and destination address for visitors.

8. The method as recited in claim 7, further comprising the step of disseminating the variable string to others across telephone lines.

9. The method as recited in claim 8, further comprising the step of pressing a send button to initiate transmission of the variable string across the telephone lines.

10. The method as recited in claim 9, wherein said step of transmitting the variable string transmits an audible signal across the telephone line indicative of the variable string.

11. The method as recited in claim 9, wherein said step of transmitting the variable string transmits a data signal across the telephone line indicative of the variable string.

12. The method as recited in claim 8, further comprising the step of initiating establishment of a communication channel with an emergency services station across the telephone line upon activation of an emergency button.

13. The method as recited in claim 12, further comprising the step of transmitting the variable string across the telephone line after establishing a communication channel in said step of initiating.

14. The method as recited in claim 13, wherein said step of transmitting the variable string transmits an audible signal across the telephone line indicative of the variable string.

15. The method as recited in claim 13, wherein said step of transmitting the variable string transmits a data signal across the telephone line indicative of the variable string.

16. The method as recited in claim 7, wherein said variable string generated in said step of generating is a numerical string.

* * * * *